United States Patent [19]

Goedecke et al.

[11] Patent Number: 5,191,702
[45] Date of Patent: Mar. 9, 1993

[54] MANIPULATING APPARATUS FOR MANIPULATION OF WORKPIECES

[75] Inventors: Wolf-Dieter Goedecke, Unterkirnach; Bernhard Moosmann, Hardt; Ralf Huber, Brigachtal, all of Fed. Rep. of Germany

[73] Assignee: Mannesmann Aktiengesellschaft, Düsseldorf, Fed. Rep. of Germany

[21] Appl. No.: 646,147

[22] Filed: Jan. 25, 1991

[30] Foreign Application Priority Data

Jan. 25, 1990 [DE] Fed. Rep. of Germany ....... 4002075

[51] Int. Cl.[5] .......................... H05K 3/30; H05K 13/04
[52] U.S. Cl. ....................................... 29/742; 29/757; 29/759
[58] Field of Search .................. 29/741, 742, 739, 757, 29/759, 760, 761, 832; 198/833; 226/158; 414/403; 318/568.11

[56] References Cited

U.S. PATENT DOCUMENTS

| | | | |
|---|---|---|---|
| 3,722,062 | 3/1973 | Gharaibeh | 29/742 X |
| 4,202,092 | 3/1980 | Shibasaki et al. | 29/741 |
| 4,336,926 | 6/1982 | Inagaki . | |
| 4,459,743 | 7/1984 | Watanabe et al. | 29/740 |
| 4,573,262 | 3/1986 | Dornes et al. | 29/759 X |
| 4,637,134 | 1/1987 | Tomita et al. | 29/759 X |
| 4,694,733 | 9/1987 | Green . | |

FOREIGN PATENT DOCUMENTS

| | | |
|---|---|---|
| 0073185 | 3/1983 | European Pat. Off. . |
| 0076231 | 4/1983 | European Pat. Off. . |
| 0232999 | 8/1987 | European Pat. Off. . |
| 3339227 | 5/1985 | Fed. Rep. of Germany . |
| 8807313 | 9/1988 | Fed. Rep. of Germany . |
| 1248232 | 10/1960 | France . |
| 2548069 | 1/1985 | France . |
| 653943 | 1/1986 | Switzerland . |

Primary Examiner—Joseph M. Gorski
Assistant Examiner—Peter Dungba Vo
Attorney, Agent, or Firm—Horst M. Kasper

[57] ABSTRACT

A manipulating apparatus includes a first linear axis element (X), comprising two parallel individual axis elements (20a, 20b). The first linear axis element (X) includes a double slider (25, 27). The double slider runs on the profiles of the two individual axis elements (20a, 20b). The double slider is coupled with a drive means of the one individual axis element and runs without drive means on the profile of the other individual axis element. This manipulating apparatus permits the largest possible number of motion possibilities and motion processes along several coordinate directions within a smallest possible space.

14 Claims, 3 Drawing Sheets

MANIPULATING APPARATUS FOR MANIPULATION OF WORKPIECES

BACKGROUND OF THE INVENTION

1. Field of the Invention

The invention relates to a manipulating apparatus with a first linear shaft, comprising two parallel individual axis elements, where the first linear shaft includes a double slider, which slider runs on the profiles of the two individual axis elements, wherein the double slider is coupled with a drive means of the first single shaft and runs without drive means on the profile of the second single shaft. The invention also relates to a method for the manipulation of workpieces with such apparatus.

2. Brief Description of the Background of the Invention Including Prior Art

A manipulating device of the above-recited general kind is known. Assembly robots are employed in manipulation technology, where one or several "axes" are employed in order to perform motions along several coordinate axes or around these coordinate axes with grippers, tools, or the like. The term "axes" means in the context of the present invention either linear axis elements or rotary axis elements i.e. devices which can be actuated by external forces, which induce a motion along a straight line or around an axis, i.e. essentially a motion confined to a particular topological path.

Piston cylinder units, are usually employed in the case of linear axis elements. Piston-rod-less piston-cylinder units are prevailing in modern manipulator technology. Such piston-cylinder units without piston rods are units, where usually a pneumatic and double-acting piston runs in a cylinder tube. The piston is connected at the two front faces with a belt, a rope or the like. The belt runs along the cylinder axis, is lead outside of the cylinder via seals, is deflected by deflection rollers, and is connected at the outside of the unit with a slider. The slider runs along the outside of the cylinder and thus moves opposite to the piston. An axis element is a structure allowing to perform or performing a motion in an axial direction disposed parallel to an axis.

Solely based on such piston-rod-less linear axis elements, it is possible to build mounting and assembly robots or general manipulating devices of different types and kinds. The linear units are connected to each other at their cylinder heads or sliders, wherein the linear axis elements are disposed at an angle of 90° relative to each other, such that mounting and assembly or manipulating procedures can be performed along a multitude of cartesian coordinates. In this context, a combination of rotation axes is of course also possible such that additional polar coordinates can be taken into consideration in the control of the device.

It is understood that, in addition to piston-rod-less piston cylinder units, piston cylinder units with piston rod or profile slider units with gear belt drives or spindle drives can also be employed as linear axes.

If the first linear axis element is combined with a second linear axis element such that the two axis elements form an angle of 90° relative to each other, and if the first axis element is spatially fixed with its cylinder head, for example, in the kind of a portal frame, then the second linear axis element, running perpendicular to the first linear axis element, operates as an extension. This holds in particular in those cases where the second axis element is attached with its slider on the first axis element and is directed horizontally.

If, in this case, the second axis element, operating as an extension arm, is loaded at its free end, i.e. the cylinder-head, with a heavy tool piece, then there result substantial bending moments. These bending moments are transferred via the long lever arm of the extended second axis element and the connection of the two sliders together onto the longitudinal profile of the first axis element. Such bending moments load the guides of the slider of the first axis element onto the cylinder in a first axial direction can result in damages.

Therefore, it is known from the initially recited manipulating device to let the second linear axis element, operating as an extension arm, not only run on one single first linear axis element, but to subdivide this second linear axis element into two individual axis elements, which are disposed parallel and at a distance relative to each other. Then a double-slider runs on these two individual axes, which double slider carries the slider of the second linear axis element acting as an extension arm. In this way, the rotary moment, acting on the guide structures of the two individual axis elements of the first linear axis element, can be drastically reduced also in case of high loads of the second axis element. Only the double-slider needs to be driven on one of the two individual axis elements in order to obtain a motion of the double-slider on the individual axes of the first linear axis element, while the double slider is merely mechanically guided on the second individual axis element and runs on the second individual axis element without any specific drive associated with the second individual axis element.

It is a goal of modern manipulating and robot technology to be able to perform complex manipulating and assembly processes with a minimum number of axis elements. For this purpose an automatic assembly apparatus for electronic printed circuit boards represents a typical example. Such printed circuit boards, as is known, are equipped with device components of the most varying types and shapes. In order to achieve this, a particular gripper is required for each kind of device element. This gripper is tuned and adapted to the special shape of the device element to be operated such as round, square, rectangular, cylindrical, or the like. Thus, for the complete inserting and equipping of such printed circuit boards a plurality of axis elements has to be employed, wherein each axis element can be furnished with an assembly gripper, which is suitable for a certain kind of device components. Each of these assembly grippers, however, has to be able to pass over the area of the printed circuit boards along two cartesian coordinates, in order to be able to contact each surface position of the printed circuit board with the respective device component.

An unsolvable goal conflict results in this context for conventional manipulating and assembly apparatus, because on the one hand a plurality of complex motion processes with necessarily a plurality of axis elements is required and on the other hand it is desired to perform this procedure within a minimum space.

SUMMARY OF THE INVENTION

1. Purposes of the Invention

It is an object of the present invention to provide a manipulating device of the initially recited kind which is improved such that there is furnished the largest possible number of motion possibilities and motion processes along several coordinate directions within a smallest possible space.

It is another object of the present invention to furnish an optimized device for the equipping of printed circuit boards.

It is yet a further object of the present invention to provide a method which allows an easy and controllable handling of workpieces based on drive motions in perpendicular coordinate directions.

These and other objects and advantages of the present invention will become evident from the description which follows.

2. Brief Description of the Invention

According to the present invention, there is provided a manipulating apparatus, where a second individual axis element is disposed parallel relative to a first individual axis element and forms with the first individual axis element a first linear axis element. A first double slider is furnished at and is engaging the first linear axis element. The first double slider runs on profiles of the first individual axis element and of the second individual axis element. A second drive means is formed at the second individual axis element. The first double slider is coupled to the second drive means and runs non-driven on the profile of the first individual axis element. A second double slider runs on the profile of the first individual axis element and is not driven on the profile of the second individual axis element. A first drive means is formed at the first individual axis. The second double slider is coupled to the first drive means.

The first individual axis element can be formed by a first piston-cylinder unit without piston rod and can include a first piston. The second individual axis element can be formed by a second piston cylinder unit without piston rod and can include a second piston. The first double slider can be connected to the second piston via a second belt, and the second double slider can be connected to the first piston via a first belt. The second belt of the second individual axis element can be connected at a defined position to the first double slider and can run loosely through a second passage of the second double slider. The first belt of the first individual axis element can be connected at a defined position with the second double slider and can run loosely through a first passage of the first double slider.

A fourth individual axis element can be disposed parallel relative to the third individual axis element and can form with the third individual axis element a second linear axis element. A third axis element of the second linear axis element can be attached to the first double slider. The fourth individual axis element for the second linear axis element can be attached to the second double slider.

The first linear axis element and the second linear axis element can include an intermediate angle of 90° as seen in a top projection.

The third individual axis element of the second linear axis element and the fourth individual axis element of the second linear axis element can include a third slider and can be attached with the third slider on the first double slider and on the second double slider of the individual axis elements of the first linear axis element.

Assembly grippers, can each be attached to one corresponding cylinder head of the respective third and fourth individual axis elements of the second linear axis element.

A transport structure can serve for an inserting and filling of printed circuit boards. The first linear axis element can be disposed as a portal-frame shaft above the transport structure. The second linear axis element can run in a direction of the advancing transport.

Cylinders of the first individual axis element and of the second individual axis element of the first linear axis element can be spatially fixedly disposed.

A method for manipulating subjects comprises the following steps. Printed circuit boards are transported into lower mounting positions. The printed circuit boards are equipped with devices carried by grippers. An insertion and mounting phase of the printed circuit boards with devices is finished. Transport devices are actuated such that all printed circuit boards are transported further by one grid position in transport direction. Four printed circuit boards can be filled simultaneously. Transport devices for the printed circuit boards can be advanced by two grid steps after completion of inserting and mounting. Two grippers, disposed along an axis can operate synchronously.

According to the invention there is furnished additionally a second double slider on the cylinders. This second double slider is coupled with a drive means of the second individual axle and runs undriven on the cylinder of the first individual axle.

In the course of developing of the present invention it was initially recognized that per se a linear axis concept, developed for the handling of heavy work pieces, with a first linear axis element comprising two individual axis elements, could be advantageously employed in order to obtain a realization of a plurality of linear axis elements disposed on a smallest possible space based on a further suitable, constructive improvement. For this purpose there is furnished a second linear axis element with a double slider in the already recited manner, where the drive and guide is formed in mirror image to the drive and guide of the known second linear axis element.

In this manner it is surprisingly possible to control the two second linear axis elements completely independent from each other, whereby the increased mechanical stability and thus also an increased precision of the guidance remains fully maintained. Since the motion region covered by motions in the direction of the two elements of the second linear axis element overlap nearly completely, if one disregards small edge regions which are determined by the width of the second linear axis element, then complex mounting, assembly, manipulating, insertion and filling processes are possible and in fact also in a way, where the functions of the two second linear axis elements refer to one and the same workpiece.

According to a preferred embodiment of the invention manipulating device, the individual axis elements are formed in a per se known manner of piston cylinder units without piston-rods, where the sliders are connected to the piston via belts. One first belt of the first individual axis element is connected to the first double slider and passes loosely through a passage in the second double slider. The second belt of the second individual axis element is connected to the second double slider and passes loosely through a passage in the first double slider.

These features and procedures are associated with the advantage that commercial components can be employed in order to build the invention manipulating apparatus. In this case, only small modifications are required in order to loosely guide the actuating belt in the described way in each case through a section of the double slider.

According to a further preferred embodiment of the invention, in each case an additional second individual shaft of a second linear axis element is attached to each double slider.

This feature is associated with the advantage that in a simple way a two-axis device, for example, a two-axis robot can be constructed.

This holds in particular in those cases where the directions of the first linear axis element and a second linear axis element include an intermediate angle of 90° as is per se known.

This holds further in particular when the cylinders of the individual axis elements of the first linear axis element are spatially fixedly disposed.

This is in fact associated with the advantage that a portal frame arrangement can be created, where the first linear axis element allows and performs a motion crosswise over a workpiece conveyor or belt, while the second linear axis element performs a motion in the direction of the conveyor belt.

As already indicated, the invention is particularly suitable to build an automatic assembly machine for the insertion and mounting of printed circuit boards. According to the invention, several variations of assembly processes can be performed. For example, if an assembly robot is to be employed, where the second linear axis element of the assembly robot comprises two individual axis elements, then the cylinder heads can be mounted with the assembly grippers. If, in each case, only one cylinder head of each individual axis element is mounted with an assembly gripper, then the insertion or mounting process can be performed either parallel at two printed circuit boards, disposed next to each other, or sequentially one after the other with the two assembly grippers.

In contrast, if the two individual axis elements of the second linear axis elements are furnished at their two cylinder heads with assembly grippers, then either up to four printed circuit boards can be simultaneously equipped and mounted, or the two assembly grippers, at one end of the individual axis elements, can initially mount and equip two printed circuit boards in order then to move the printed circuit board to the oppositely disposed cylinder heads, where further insertion, mounting and/or filling processes are then performed. The transport device, employed for the printed circuit boards for this purpose, allows an individual transport in each individual printed circuit board. Thus, the insertion, mounting and/or filling can be performed without time interruption, in that the printed circuit boards, equipped and mounted by the assembly grippers at one end of the individual axis elements, are initially transported to an intermediate position at about half-length of the individual axis elements. The assembly grippers, disposed at the second end of the individual axis elements, continue a mounting and equipping at the printed circuit boards already transported to this position.

Additional advantages result from the structures shown in the accompanying drawing.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

According to the present invention, there is provided for a manipulating apparatus. A first linear axis element X includes two parallel individual axis elements 20a, 20b. The linear axis element X exhibits a double slider 25, 27. The double slider 25, 27 runs on profiles of the first individual axis element 20a and of the second individual axis element 20b. The double slider 25, 27 is coupled with a drive means of the second individual axis element 20b and runs non-driven on the profile of the first individual axis element 20a. Additionally, a second double slider 26, 28 runs on the profiles. The second double slider 26, 28 is coupled with a drive means of the first individual axis element 20a. The second double slider 26, 28 can run non-driven on the profile of the second individual axis element 20b.

The first individual axis element 20a and the second individual axis element 20b can be formed by piston-cylinder units without piston rods. The sliders 25 to 28 can be connected to the pistons 29 via belts 24a, 24b. The second belt 24b of the second individual axis element 20b can be connected at a position 40a to the first double slider 25, 27 and can run loosely through a passage 41b of the second double slider 26, 28. The first belt 24a of the first individual axis element 20a can be connected at a position 40b with the second double slider 26, 28. The first belt 24a can run loosely through a passage 41a of the first double slider 25, 27. An additional individual axis element 30a, 30b of a second linear axis element Y can be mounted via sliders 31a, 31b to double sliders 25, 27; 26, 28. The first linear axis element X and the second linear axis element Y can include an angle of 90°. The additional individual axis elements 30a, 30b of the second linear axis element Y can be attached with their sliders 31a, 31b on the double sliders 25 to 28 of the individual axis elements 20a, 20b of the first linear axis element X.

Assembly grippers 36a, 36b, 37a, 37b can be attached in each case at least at one cylinder head 34a, 34b, 35a, 35b of the additional individual axis elements 30a, 30b of the second linear axis element Y.

The first linear axis element X can be disposed as a portal-frame shaft above a transport structure 45 for an inserting and filling of printed circuit boards 48. The second linear axis element Y can run in a direction of the transport.

Cylinders 21a, 21b of the individual axis elements 20a, 20b of the first linear axis element X can be spatially fixedly disposed.

Figure 1:
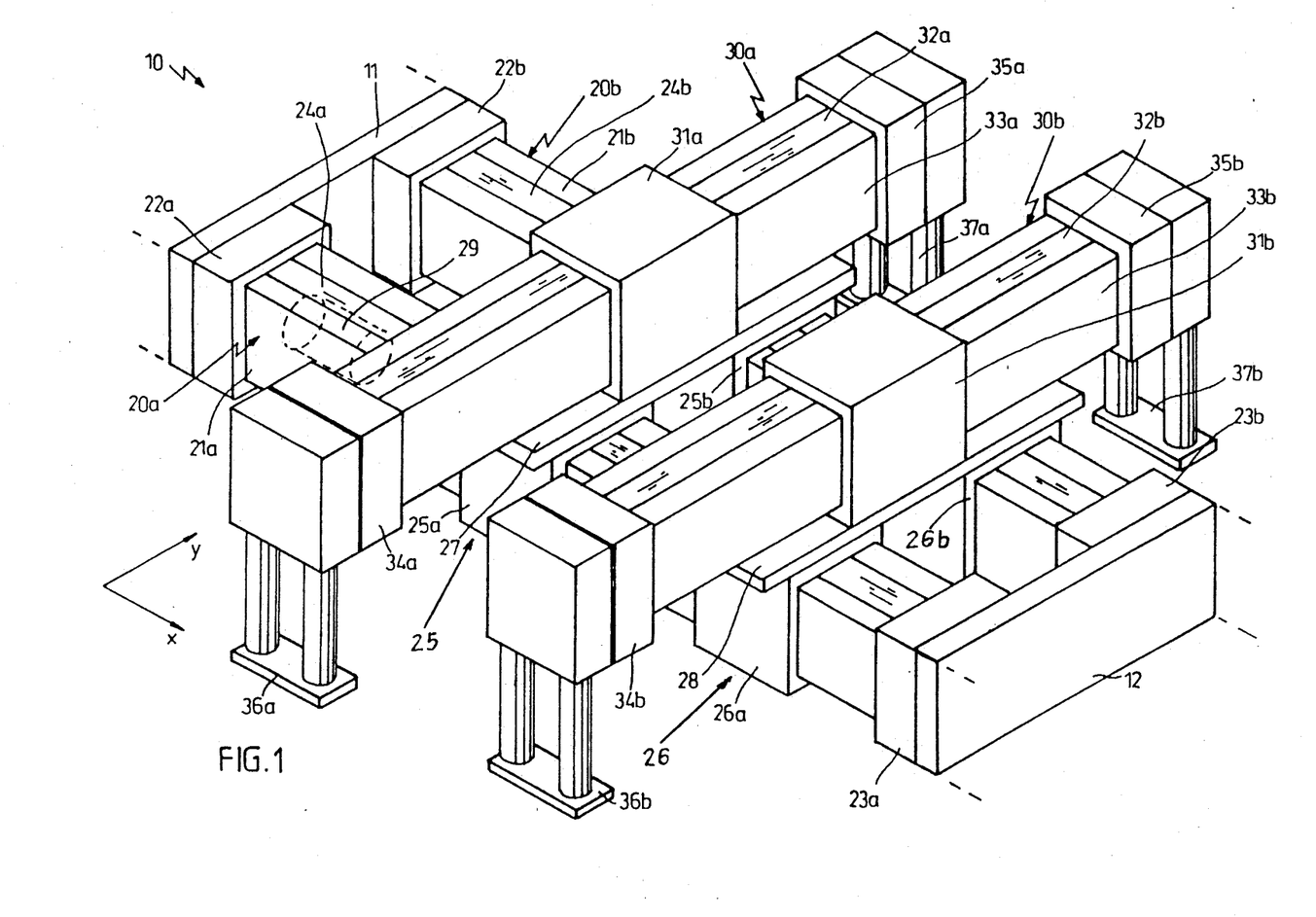
FIG. 1 shows schematic perspective view of an exemplified embodiment of the invention manipulator.
Figure 2:
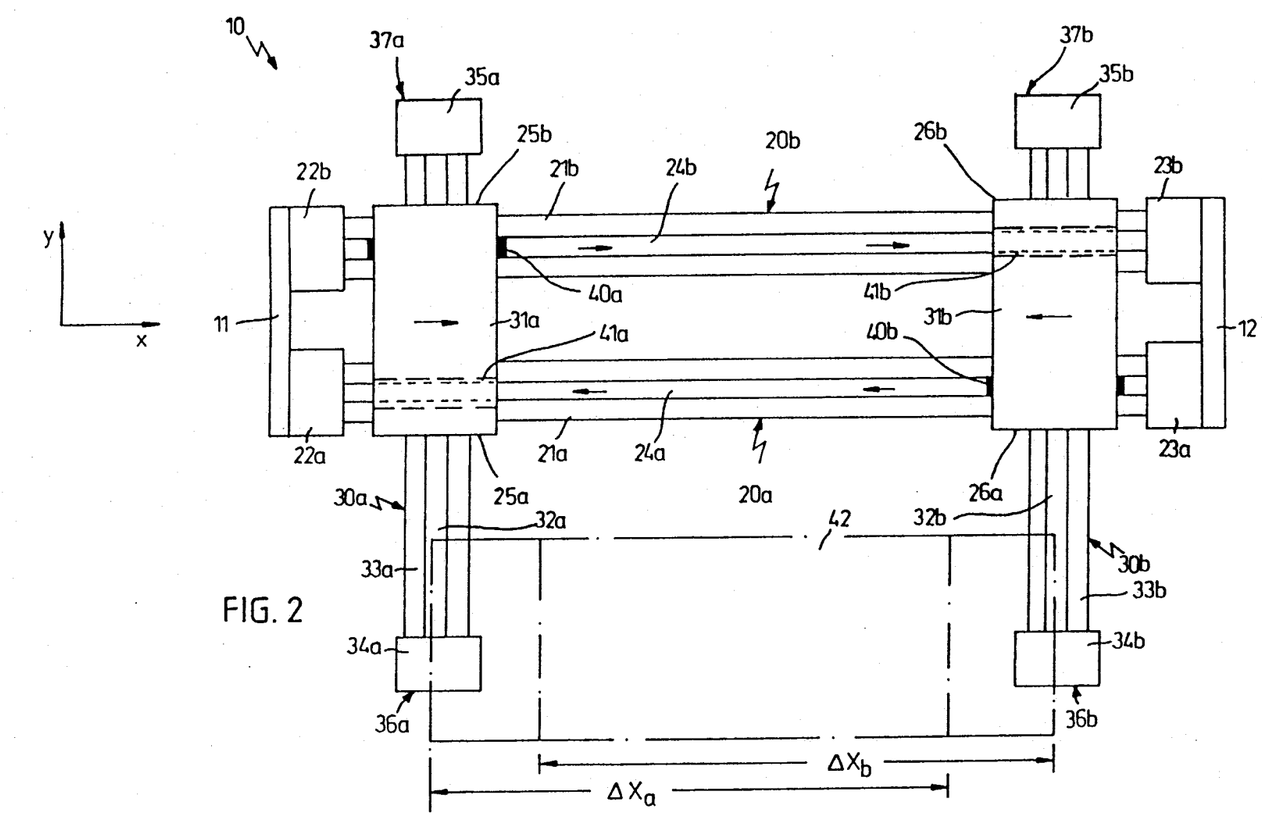
FIG. 2 is a top plan view onto the manipulator according to FIG. 1.

Reference numeral 10 designates in FIGS. 1 and 2 an exemplified embodiment of the invention manipulating apparatus as it is employed as a two-axes assembly robot. The manipulating apparatus 10 is oriented with respect to two mounting or assembly plates 11 and 12 according to this embodiment. As indicated with the dashed line the mounting plates 11 and 12 are disposed at a distance from each other and can be spatially fixedly mounted. The mounting plates 11 and 12 can in this case form the end points of a portal frame, which is disposed above the conveyor belts for the workpieces.

A first linear axis element extends between the mounting plates 11 and 12, where the axis element is to be designated in the coordinate system illustrated in FIGS. 1 and 2 as the axis element. The axis element comprises a first individual axis element 20a and a second individual axis element 20b, forming two individual axis elements 20a, 20b. The individual axis elements 20a, 20b exhibit a first cylinder 21a and second cylinder 21b, respectively. At the free ends of the cylinders there are disposed left cylinder heads, in the view of FIG. 1 and 2, designated with reference numerals 22a, 22b and right cylinder heads 23a, 23b.

The individual axis elements 20a, 20b are piston-cylinder units without piston rods. Consequently, the individual axis elements 20a, 20b are in each case furnished with a belt 24a, 24b, which runs on the upper side of the cylinder 21a, 21b, which is deflected by 180° around the cylinder heads 22a, 22b, 23a, 23b, in a way not illustrated in detail, and which runs within the cylinder 21a, 21b in opposite direction. However, it is to be understood that piston-cylinder units with piston rod or profile-slider units with gear belt or spindle drive could just as well be employed.

Slider sections 25a and 25b form a first, left double slider 25 which is guided form-lockingly and form-matchingly with its section 25a on the cylinder 21a and form-lockingly and form-matchingly with its section 25b on the cylinder 21b. Slider sections 26a, 26b form a second, right double slider 26 which is guided form-lockingly and form-matchingly with its section 26a on the cylinder 21a and form-lockingly and form-matchingly with its section 26b on the cylinder 21b. The double sliders 25a, 25b or 26a, 26b, respectively, are formed in that in a direction perpendicular to the X axis, the sections 25a and 25b are rigidly connected to each other by way of a left connection plate 27 and the sections 26a, 26b are rigidly connected to each other by way of a right connection plate 28.

As indicated in FIG. 1, a piston 29 runs within the cylinder 21a. The piston 29 is connected at its two front faces with the free ends of the belt 24a. As can be recognized from FIG. 2, the belt 24a is further connected at the position designated with 40b to the right double slider 26a, 26b, while the belt 24a is guided merely loosely in a passage 41a through the left double slider 25a, 25b.

In a corresponding way, the belt 24b is fixedly connected to the double slider 25a, 25b at the location 40a, whereas the belt 24b passes loosely through a passage 41b at the right double slider 26a, 26b. In addition, the belt 24b is also connected with piston, not illustrated in the figures, where the piston runs in the interior of the cylinder 21b.

It is achieved in this manner that the two double sliders 25a, 25b or 26a, 26b, respectively, can be moved independent from each other by moving the right double slider 26a, 26b by motion of the piston 29 over the belt 24a and that the two double sliders can simultaneously be loosely supported by the mechanical guide on the second cylinder 21b, while in the case of the left double slider 25a, 25b it is identical in a mirror image.

In addition, the elements of a further linear axis elements are attached at the connection plate 27 or 28, respectively. This linear axis element is designated as Y-axis element according to the coordinate system in FIG. 1 and 2. The Y-axis element is again subdivided into two individual axis elements 30a and 30b. The first individual axis element 30a is attached on the connection plate 27 and the second individual axis element 30b is attached on the connection plate 28. Otherwise, the individual axis elements 30a, 30b are preferably of identical construction and, for stability reason, are built of a lighter weight than the individual axis elements 20a, 20b of the axis elements.

The individual axis elements 30a, 30b comprise in each case a slider 31a, 31b. Cylinders 33a, 33b are guided and moved by belts 32a, 32b through the sliders 31a, 31b. Since the sliders 31a and 31b are fixedly attached on the connection plates 27, 28, an actuation of the individual axis elements 30a, 30b, effects a moving of the cylinder 33a, 33b relative to sliders 31a, 31b. The sliders 31a, 31b are preferably formed of a longer extension in an axis direction as compared to the sliders 25a, 25b or 26a, 26b of the axis element in order to increase the flexural strength bending.

The left cylinder heads 34a, 34b, illustrated in FIGS. 1 and 2 as well as the right cylinder heads 35a, 35b of the Y individual axis elements 30a, 30b are furnished with left assembly grippers 36a, 36b or with right assembly grippers 37a, 37b, respectively. The assembly grippers 36a, 36b; 37a, 37b serve for the gripping of electrical and electronic device elements as they are disposed on the printed circuit boards.

The work region 42 of the manipulating apparatus 10 is indicated in FIG. 2 by a dash-dotted line in the lower half of the figure. The work region 42 can be covered in the Y direction in that either the total manipulating apparatus 10 is moved in Y direction relative to a reference plane or, in case of a spatially fixed disposition of the mounting plates 11, 12, a transport device or the like moves workpiece in Y direction below the manipulating apparatus 10.

The work region 42 is limited in X direction by the maximum moving range of the double sliders 25a, 25b as well as 26a, 26b on the X individual axis elements 20a, 20b. This X direction moving range is designated with delta $X_A$ and delta $X_B$ in FIG. 2. It can be recognized from the representation of FIG. 2 that the individual work regions overlap each other substantially such that, for example, the assembly grippers 36a, and 36b either can insert in each case on their side separate printed circuit board or provide a joint mounting of a printed circuit board disposed within the overlap region of the work region 42.

Figure 3:
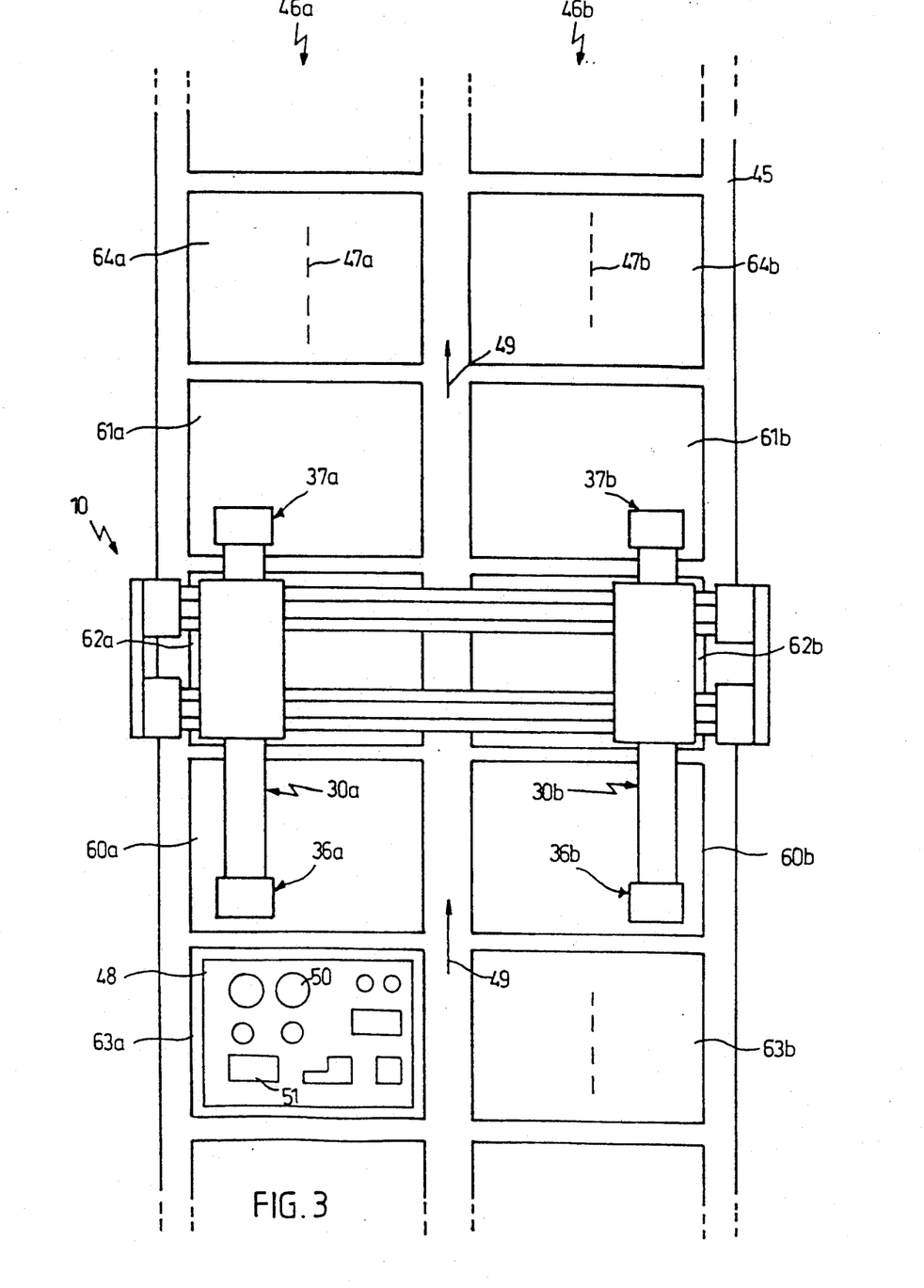
FIG. 3 is a top plan view onto a representation of a practical usage procedure of the manipulator, according to FIG. 1 and 2, for the device insertion, mounting and/or filling of printed circuit boards.

FIG. 3 shows a printed-circuit-board mounting device with a two-axis elements automatic assembly device, as it is illustrated by the manipulating apparatus 10 according to FIG. 1 and 2.

A transport structure 45 is provided in the already recited manner according to the FIG. 3. The transport structure 45 runs along below the manipulating apparatus 10 spatially fixed as a portal frame. The transport structure 45 is furnished in two rows with two individual rows 46a and 46b. A transport structure 47a, 47b is disposed under each row 46a, 46b in order to be able to move printed circuit boards in the direction of the arrow 49, i.e. in Y direction. Only one single printed circuit board, designated with reference numeral 48, is indicated in in FIG. 3t. The arrangement is preferably made such that the transport structures 47a, 47b can transport each printed circuit board 48 individually and that not only a joint transport of all printed circuit boards is possible in one direction 49 as is the case with a transport belt.

The lower assembly positions 60a, 60b can be furnished and disposed in transport direction 49 upstream of the manipulating apparatus 10. Correspondingly, symmetrically disposed upper assembly positions downstream of the manipulating apparatus 10, are designated with reference numerals 61a, 61b. Intermediate positions below the manipulating apparatus 10 are designated with reference numerals 62a, 62b, and positions disposed upstream of the lower mounting positions or, respectively, downstream below the upper mounting positions 61a, 61b are designated with reference numerals 63a, 63b or 64a, 64b, respectively.

Consequently, the following assembly and mounting procedures are possible according to the invention.

According to a first method, in each case only one cylinder head of each individual Y axis element 30a, 30b is to be equipped with an assembly gripper, i.e. for example, with the assembly grippers 36a and 36b in FIG. 3. The mounting and assembly of the printed circuit boards 48 can now progress such that these printed circuit boards, as soon as they are transported in the rows 46a, 46b onto the lower mounting positions 60a, 60b, are equipped there by way of the assembly grippers 36a or 36b, respectively. Upon finishing of the insertion and mounting process, the transport structures 47a, 47b are actuated such that all printed circuit boards 48 are, in each case, transported further by one position grid in the transport direction 49.

According to a second method, all cylinder heads of the individual Y axis elements 30a, 30b are furnished with assembly grippers 36a, 36b; 37a, 37b. A total of four printed circuit boards can now be simultaneously filled, with devices i.e those printed circuit boards which are at that time disposed at the assembly positions 60a, 60b, 61a and 61b. For this purpose, all four assembly grippers 36a, 36b; 37a, 37b perform in each case the same assembly procedure. After completed mounting, the transport structures 47a, 47b have to advance the printed circuit boards by, in each case, two grid steps of the position grid, such that, in each case, unmounted printed circuit boards pass below the assembly grippers 36a, 36b, 37a and 37b.

In case of the two precedingly recited methods, in most cases only one kind of possible device element types is assembled, if the Y axis elements operate synchronously, since the assembly grippers 36a, 36b, 37a and 37b, as already recited, are usually only suitable for one single kind of device elements. However, an asynchronous actuation of the Y axis element is also possible, such that each individual Y axis elements equips a different device element inserted by each Y-individual axis element. The individual Y axis element can work in this case in the overlapping region crosswise relative to each other. It has to be considered furthermore that, in case of the two precedingly described methods, an assembly or mounting is not possible while the transport structures 47a, 47b are in operation. After all, it has to be considered that employing the second recited method, there are to be maintained extremely high requirements in regard to the positioning accuracy for the printed circuit boards relative to the individual Y axis elements 30a, 30b, because otherwise two individual axis elements could not simultaneously equip four printed circuit boards.

According to a third assembly method, there are in fact also provided four assembly grippers 36a, 36b, 37a and 37b. Preferably, however, the upstream disposed assembly grippers 36a, 36b are furnished for a first kind of device elements, as is indicated in FIG. 3 by circular-shaped device elements 50. The downstream disposed assembly grippers 37a, 37b are in contrast suitable for a second kind of device elements, as indicated in FIG. 3 by rectangular-shaped device elements 51.

The assembly course is now set such that unfilled and empty printed circuit boards initially pass to the lower assembly position 60a, 60b. At this assembly position 60a, 60b, the printed circuit boards are filled by the assembly grippers 36a, 36b with circular-shaped device elements 50. The downstream disposed assembly grippers 37a, 37b are at this time not in operation.

Then, the transport structures 47a, 47b are advanced by one position grid such that the printed circuit boards 48, in part filled with round device elements 50 pass into the intermediate positions 62a, 62b. Simultaneously, empty printed circuit boards 48 pass into the lower mounting position 60a, 60b.

Thus, the starting position is reached.

While now subsequently the empty printed circuit boards 48, disposed on the lower mounting and assembly positions 60a, 60b, are filled by way of the assembly grippers 36a, 36b with circular-shaped device elements 50, the printed circuit boards, precedingly filled with circular-shaped device elements 50 which were initially located at the intermediate positions 62a, 62b, are already brought by way of the individually acting transport structures 47a, 47b to the upper assembly position 61a, 61b, where the assembly grippers 37a, 37b are initially not active.

However, as soon as the still proceeding filling process in the lower assembly positions 60a, 60b is terminated, then the filling process is switched over to an assembly of the printed circuit boards 48, already partially filled with circular device elements 50, without pause and intermission, which printed circuit boards 48 are now disposed at the upper mounting position 61a, 61b. While the downstream disposed assembly grippers 37a, 37b now become active there, the upstream disposed assembly grippers 36a, 36b are not active. However, the printed circuit boards 48, previously partially filled with circular device elements 50 at the lower assembly positions 60a, 60b, are brought to the intermediate positions 62a, 62b by way of the transport structures 47a, 47b, while simultaneously empty printed circuit boards 48 are brought to the lower assembly positions 60a, 69b and are kept ready at these positions.

If now the still continuing assembly process on the upper assembly positions 61a, 61b is finished by the downstream disposed assembly grippers 37a, 37b and the printed circuit boards 48 disposed there are now filled with rectangular device elements 51, then a switching can be performed again to the upstream disposed assembly grippers 36a, 36b without interruption. These assembly grippers 36a, 36b immediately start to furnish the empty printed circuit boards 48, disposed in the lower assembly positions 60a, 60b with circular device elements at the same time, as already recited, the printed circuit boards 48, previously partially filled with circular device elements 50, are transported from the intermediate positions 62a, 62b to the upper assembly positions 61a, 61b. It is therefore possible in this way to operate and work without any rest operating times caused by the transport of the printed circuit boards.

It is to be understood that the precedingly described methods of operation according to one of the three recited methods can also be performed with, in each case, one single printed circuit board in the positions 60 ..., just as it is also possible, that in each case not only one printed circuit board but several printed circuit boards, disposed parallel to each other or sequentially to each other, can be filled by each assembly gripper in each of the positions 60 ..., in deviation from the exemplified representation of FIG. 3. Furthermore, combinations of the above illustrated methods are conceivable.

It will be understood that each of the elements described above, or two or more together, may also find a useful application in other types of robot manipulating technology differing from the types described above.

While the invention has been illustrated and described as embodied in the context of a manipulating apparatus and a method for manipulation of workpieces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A manipulating apparatus comprising
a first individual axis element;
a second individual axis element disposed parallel relative to the first individual axis element and forming with the first individual axis element a first linear axis element;
a first double slider furnished at and engaging the first linear axis element, wherein the first double slider runs on profiles of the first individual axis element and of the second individual axis element;
a second drive means formed at the second individual axis element, wherein the first double slider is coupled to the second drive means and runs non-driven on the profile of the first individual axis element;
a second double slider running on the profile of the first individual axis element and non-driven on the profile of the second individual axis element;
a first drive means formed at the first individual axis element, wherein the second double slider is coupled to the first drive means,
wherein the first individual axis element is formed by a first piston-cylinder unit without piston rod and including a first piston, and wherein the second individual axis element is formed by a second piston-cylinder unit without piston rod and including a second piston, wherein the first double slider is connected to the second piston via a second belt, and the second double slider is connected to the first piston via a first belt, wherein the second belt of the second individual axis element is connected at a defined position to the first double slider and runs loosely through a second passage of the second double slider, wherein the first belt of the first individual axis element is connected at a defined position with the second double slider and runs loosely through a first passage of the first double slider.

2. The manipulating apparatus according to claim 1, wherein cylinders of the first individual axis element and of the second individual axis element of the first linear axis element are spatially fixedly disposed.

3. The manipulating apparatus according to claim 1, further comprising
a third individual axis element; a fourth individual axis element disposed parallel relative to the third individual axis element and forming with the third individual axis element a second linear axis element, wherein the third individual axis element of the second linear axis element is mounted to the first double slider, and wherein the fourth individual axis element of the second linear axis element is mounted to the second double slider.

4. The manipulating apparatus according to claim 3, wherein the first linear axis element and the second linear axis element intersect at an intermediate angle of 90° as seen in a top projection.

5. The manipulating apparatus according to claim 3, wherein the third individual axis element of the second linear axis element and the fourth individual axis element of the second linear axis element include a third slider and is attached with the third slider on the first double slider and on the second double slider of the individual axis elements of the first linear axis element.

6. The manipulating apparatus according to claim 5, further comprising
assembly grippers, each attached to one corresponding cylinder head of the respective third and fourth individual axis elements of the second linear axis element.

7. Manipulating apparatus according to claim 6, further comprising
a transport structure for an inserting and filling of printed circuit boards, wherein the first linear axis element is disposed as a portal-frame shaft above the transport structure and wherein the second linear axis element runs in a direction of the advancing transport.

8. A manipulating apparatus with a first linear axis element (X) including a first individual axis element (20a) and a second parallel individual axis element (20b), wherein a linear axis element (X) supports a first double slider (25, 27), wherein the first double slider (25, 27) runs on profiles of the first individual axis element (20a) and of the second individual axis element (20b), wherein the first double slider (25, 27) is coupled with a drive means of the second individual axis element (20b) and runs non-driven on the profile of the first individual axis element (20a), wherein, additionally, a second double slider (26, 28) runs on the profiles, wherein the second double slider (26, 28) is coupled with a drive means of the first individual axis element (20a), and wherein the second double slider (26, 28) runs non-driven on the profile of the second individual axis element (20b), wherein the first individual axis element (20a) and the second individual axis element (20b) are formed by piston cylinder units without piston rods, wherein the double sliders (25 to 28) are connected to pistons (29) through a first belt (24a) and a second belt (24b), wherein the second belt (24b) of the second individual axis element (20b) is connected at a position (40a) to the first double slider (25, 27) and runs loosely through a passage (41b) of the second double slider (26, 28), wherein the first belt (24a) of the first individual axis element (20a) is connected at a position (40b) with the second double slider (26, 28), and wherein the first belt (24a) runs loosely through a passage (41a) of the first double slider (25, 27).

9. The manipulating apparatus according to claim 8, wherein cylinders (21a, 21b) of the individual axis elements (20a, 20b) of the first linear axis element (X) are spatially fixedly disposed.

10. The manipulating apparatus according to claim 8, wherein a third individual axis element (30a) of a second linear axis element (y) is mounted through a first individual slider (31a) to the first double slider (25, 27) and a fourth individual axis element (30b) of the second linear axis element (y) is mounted through a second individual slider (31b) to the second double slider (26, 28).

11. The manipulating apparatus according to claim 10, wherein the first linear axis element (X) and the second linear axis element (Y) intersect at an angle of 90°.

12. The manipulating apparatus according to claim 10, wherein the additional individual axis elements (30a, 30b) of the second linear axis element (Y) are attached with their sliders (31a, 31b) on the double sliders (25 to 28) of the individual axis elements (20a, 20b) of the first linear axis element (X).

13. The manipulating apparatus according to claim 12, wherein assembly grippers (36a, 36b, 37a, 37b) are attached in each case at least at one cylinder head (34a, 34b, 35a, 35b) of the additional individual axis elements (30a, 30b) of the second linear axis element (Y).

14. Manipulating apparatus according to claim 13, wherein the first linear axis element (X) is disposed as a portal-frame shaft above a transport structure (45) for an inserting and filling of printed circuit boards (48), and wherein the second linear axis element (Y) runs in a direction of the transport.

* * * * *